(12) United States Patent
Li (10) Patent No.: US 8,276,101 B2
(45) Date of Patent: Sep. 25, 2012

(54) TOUCH GESTURES FOR TEXT-ENTRY OPERATIONS

(75) Inventor: Yang Li, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,089

(22) Filed: Sep. 30, 2011

(65) Prior Publication Data

US 2012/0216141 A1 Aug. 23, 2012

Related U.S. Application Data

(63) Continuation of application No. 13/030,623, filed on Feb. 18, 2011.

(51) Int. Cl.
  *G06F 3/033* (2006.01)
  *G06F 17/24* (2006.01)
  *G06F 3/14* (2006.01)
  *G06F 3/048* (2006.01)
  *G06F 3/041* (2006.01)

(52) U.S. Cl. ........ 715/863; 715/255; 715/256; 715/268; 715/864; 715/780; 345/173

(58) Field of Classification Search .................. 715/702, 715/780, 863, 864, 255, 256, 268; 345/173
  See application file for complete search history.

(56) References Cited

U.S. PATENT DOCUMENTS

| | | | | |
|---|---|---|---|---|
| 5,677,710 A | * | 10/1997 | Thompson-Rohrlich | ..... 345/173 |
| 5,917,493 A | * | 6/1999 | Tan et al. | ....................... 715/863 |
| 7,164,410 B2 | * | 1/2007 | Kupka | ........................... 345/173 |
| 2005/0244058 A1 | | 11/2005 | Gorbatov et al. | |
| 2006/0210163 A1 | * | 9/2006 | Garside et al. | ................ 382/186 |
| 2006/0242607 A1 | * | 10/2006 | Hudson | ......................... 715/863 |
| 2009/0087095 A1 | * | 4/2009 | Webb | ............................ 382/189 |

(Continued)

FOREIGN PATENT DOCUMENTS

EP 1363232 A2 11/2003

(Continued)

OTHER PUBLICATIONS

"CrossY—A crossing-based drawing application" [online]. University of Maryland and Human-Computer Interaction Lab (HCIL). Last updated on May 19, 2006. Retrieved from the Internet: <URL:http://www.cs.umd.edu/hcil/crossy> (2 pgs.).

(Continued)

*Primary Examiner* — Weilun Lo
*Assistant Examiner* — Dino Kujundzic
(74) *Attorney, Agent, or Firm* — Shumaker & Sieffert, P.A.

(57) ABSTRACT

In general, this disclosure describes techniques for providing a user of a computing device with the ability to perform text-entry operations (e.g., using a touch screen) on a computing device. Specifically, the techniques of this disclosure may, in some examples, allow the user to use gestures on a mobile computing device to perform text entry and editing operations. Using a presence-sensitive user interface device (e.g., a touch screen), the user may use gestures to enter text into text-based applications (e.g., short message service (SMS) messages, e-mail message, uniform resource locators (URLs), and the like). Using visually-defined areas on the touch screen, the user may utilize gestures of certain patterns, relative to the defined areas, to indicate text entry and editing operations such as, for example, deleting characters and words, indicating a space or return characters, and the like.

19 Claims, 9 Drawing Sheets

U.S. PATENT DOCUMENTS

| | | | |
|---|---|---|---|
| 2010/0020033 A1* | 1/2010 | Nwosu | 345/173 |
| 2011/0191675 A1* | 8/2011 | Kauranen | 715/702 |
| 2012/0030634 A1* | 2/2012 | Miyazaki | 715/863 |

FOREIGN PATENT DOCUMENTS

| | | | |
|---|---|---|---|
| EP | 1603078 A2 | 12/2005 | |
| EP | 2256610 A1 | 1/2010 | |
| GB | 2352156 A | 1/2001 | |
| WO | WO2009158213 A2 | 12/2009 | |

OTHER PUBLICATIONS

"ShaperWriter" [online]. ShapeWrite, Inc., 2009. Retrieved from the Internet: <URL:http://shapewriter.com/> (2 pgs.).

U.S. Appl. No. 13/030,623, by Yang Li, filed Feb. 18, 2011.

International Search Report and Written Opinion of international application No. PCT/US2012/025085, dated May 15, 2012, 12 pp.

* cited by examiner

TOUCH GESTURES FOR TEXT-ENTRY OPERATIONS

This application is a continuation of U.S. application Ser. No. 13/030,623 filed Feb. 18, 2011, which is hereby incorporated by reference in its entirety.

TECHNICAL FIELD

This disclosure relates to a gesture-based user interface for mobile devices.

BACKGROUND

Computing devices are continuously improving and becoming more commonly used. Additionally, touch-based interaction with touch screens of computing devices is also becoming a more common and major interaction modality for mobile device user interfaces. Touch-based interaction may be, for example, finger-based touch input.

In some instances, a user may interact with an application via tactile interaction. For example, some computing devices with touch screens allow text-entry methods based on input by a user via touch of the finger, usually utilizing an on-screen keypad.

SUMMARY

In general, this disclosure describes techniques for providing a user of a computing device with the ability to perform text-entry operations (e.g., using a touch screen) on a computing device. Specifically, the techniques of this disclosure may, in some examples, allow the user to use gestures on a mobile computing device to perform text entry and editing operations. Using a presence-sensitive user interface device (e.g., the touch screen), the user may use gestures to enter text into applications that accept text as an input (e.g., short message service (SMS) messages, e-mail message, uniform resource locators (URLs), and the like). Using visually-defined areas on the touch screen, the user may utilize gestures of certain patterns, relative to the defined areas, to indicate text entry and editing operations such as, for example, deleting characters and words, indicating a space or return character, and the like.

In one example, the disclosure is directed to a method comprising receiving, using a presence-sensitive user interface device coupled to a computing device, first user input comprising a drawing gesture associated with a first area for user input defined on the presence-sensitive user interface device, wherein the first user input specifies one or more characters to be displayed in a graphical user interface associated with the computing device, receiving, using the presence-sensitive user interface device, second user input comprising a drawing gesture, wherein the second user input comprises crossing between the first area and at least a second area for user input defined on the presence-sensitive user interface device, and wherein the second user input specifies an editing operation associated with the one or more characters, and applying, by the computing device, the editing operation to the one or more characters in response to receiving the second user input.

In another example, the disclosure is directed to a computer-readable storage medium encoded with instructions that, when executed, cause one or more processors of a computing device to perform operations comprising receiving, using a presence-sensitive user interface device coupled to the computing device, first user input comprising a drawing gesture associated with a first area for user input defined on the presence-sensitive user interface device, wherein the first user input specifies one or more characters to be displayed in a graphical user interface associated with the computing device, receiving, using the presence-sensitive user interface device, second user input comprising a drawing gesture, wherein the second user input comprises crossing between the first area and at least a second area for user input defined on the presence-sensitive user interface device, and wherein the second user input specifies an editing operation associated with the one or more characters, and applying, by the computing device, the editing operation to the one or more characters in response to receiving the second user input.

In another example, the disclosure is directed to a computing device comprising one or more processors, a presence-sensitive user interface device, a user interface module operable by the one or more processors to receive, using the presence-sensitive user interface device, first user input comprising a drawing gesture associated with a first area for user input defined on the presence-sensitive user interface device, wherein the first user input specifies one or more characters to be displayed in a graphical user interface associated with the computing device, wherein the user interface module is further operable to receive, by the presence-sensitive user interface device, second user input comprising a drawing gesture, wherein the second user input comprises crossing between the first area and at least a second area for user input defined on the presence-sensitive user interface device, and wherein the second user input specifies an editing operation associated with the one or more characters, and means for applying, by the computing device, the editing operation to the one or more characters in response to receiving the second user input.

Certain techniques of the present disclosure may, as one non-limiting example, allow a user of a computing device to perform certain text-editing operations using gestures on a touch screen of the computing device. The user may enter different patterns using the gestures, relative to defined areas on the touch screen, to indicate the desired text-editing operation, without necessarily switching to an on-screen keypad.

The details of one or more implementations of the disclosure are set forth in the accompanying drawings and the description below. Other features, objects, and advantages of the disclosure will be apparent from the description and drawings, and from the claims.

DETAILED DESCRIPTION

In general, this disclosure describes techniques for providing a user with the ability to perform text entry and editing operations using gestures (e.g., using a presence-sensitive user interface device, such as a touch screen user interface) on a computing device. These techniques may allow the user to use gestures on a computing device to perform text entry and editing operations, for example, via simple interactions with the touch screen. These techniques may be integrated with existing systems that allow for the user to utilize gestures on a touch screen to enter letters and punctuation, thus potentially obviating any issues associated with text entry using on-screen keypads (e.g., touching the wrong key or multiple keys). Using the touch screen, the user may use gestures to enter text into text-based applications (e.g., SMS messages, e-mail message, URLs, and the like). A portion of the touch screen may be allocated for text entry using gestures (e.g., the lower region of a touch screen). Using visually-defined areas within the text entry region, the user may utilize gestures of certain patterns relative to the defined areas to indicate text entry and editing operations such as, for example, deleting characters and words, indicating a space or return characters, and the like. In one example, the touch screen may be divided into two regions, an upper region and a lower region. A user may utilize the lower region to provide drawing gestures that define characters and operations, which may be displayed within the upper region. The drawings gestures may be also displayed within the lower region as the user interacts with the lower region of the touch screen, as will be illustrated in more detail below.

As touch-screen computing devices become more prevalent, finger-based touch input, though intuitive, may suffer from low precision due to at least two known issues. One issue is that the area touched by the finger is, in some situations (e.g., small mobile devices), much larger than a single pixel, sometimes referred to as "the fat finger" issue. Therefore, the low precision of finger input may become an issue, where small user interface components are often difficult to operate on a computing device, such as, using on-screen keypads to enter and edit text. The issue is further amplified when the user is in motion, e.g., walking, and unable to pay close attention to the interface.

Some computing devices provide user interfaces that allow the user to use gestures to enter text, by defining a portion of the touch screen as a text entry region, where the user utilizes his/her finger or a stylus to draw the letters for text entry. However, such user interfaces may not always provide a user with the ability to perform text entry and editing operations not related to drawing characters (e.g., letters, punctuation, numbers) using gestures. For example, to input such characters as SPACE, RETURN, or DELETE, the user would typically have to switch to an on-screen keypad to perform the text entry and editing operations by touching the corresponding keys. This can be inconvenient as it can make the process of entering text cumbersome and/or it can have the same issues associated with entering text using an on-screen keypad.

The techniques of this disclosure provide a region of the user interface (e.g., touch screen) dedicated for text entry (e.g., a lower region) to allow a user to implement text entry and editing operations, other than entry of text characters, using gestures (e.g., on the touch screen). Editing operations may include entry of non-alphanumeric characters that also have associated operations such as adding SPACE and inserting the RETURN character, and may also include activating operations such as deleting the last character, deleting all the text entered, indicating ENTER, and the like. Rather than switching to an on-screen keypad to enter the text entry and editing operations, the techniques define areas or sub-regions within the region dedicated for text entry, where the user may utilize gestures involving the sub-regions to effectuate the desired text entry and editing operations. The areas or sub-regions may be defined using on-screen markers (e.g., horizontal and/or vertical lines), and the user may utilize gestures to interact with the different areas to produce the desired outcome (e.g., SPACE, DELETE, RETURN, and the like). The defined areas and the patterns may be large enough relative to on-screen keypad buttons, such that the level of accuracy of where the user touches the screen is not as particular as when using an on-screen keypad. Additionally, these techniques allow for the user to continuously input text without having to switch back and forth between gesture-based text entry and an on-screen keypad.

Figure 1:
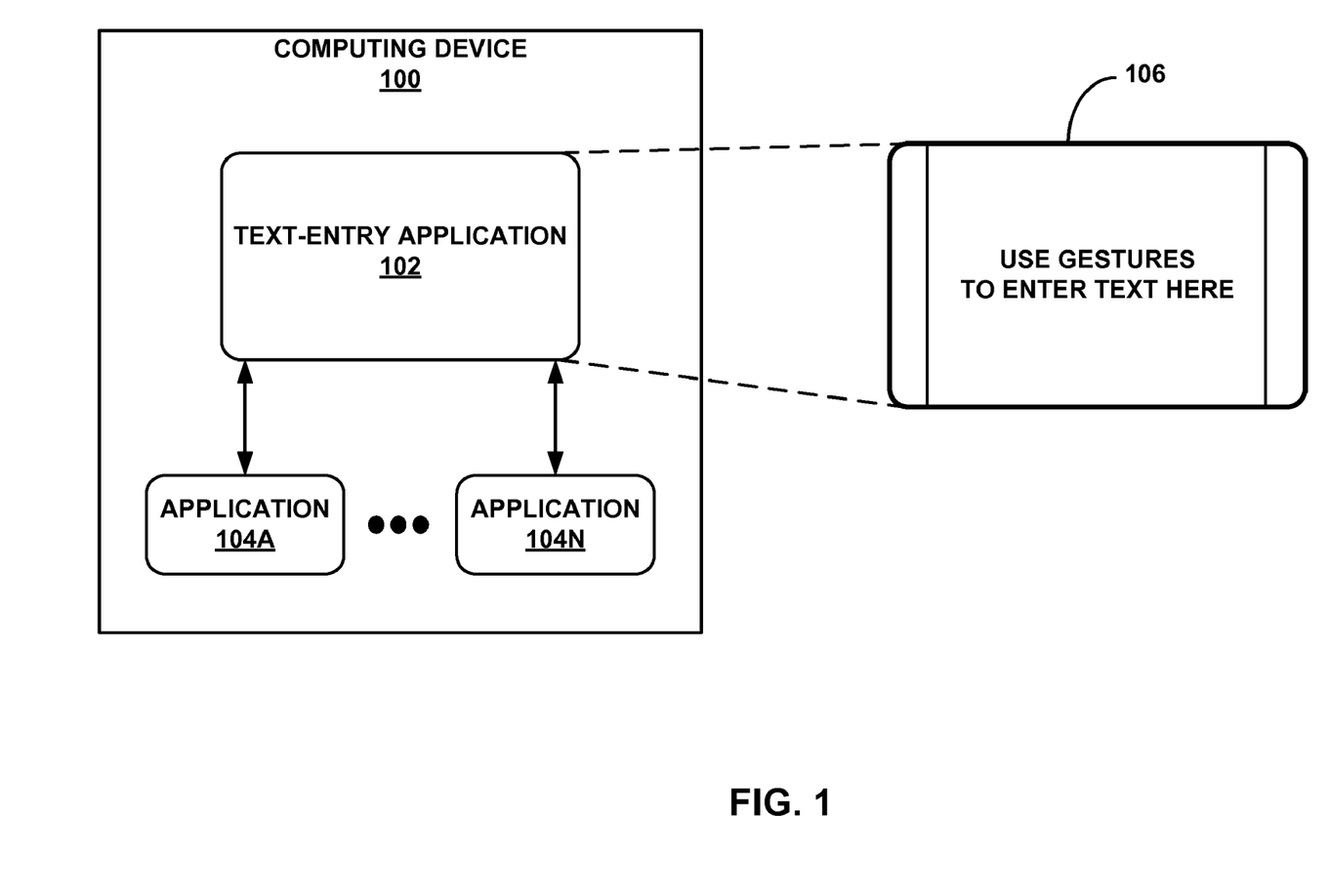
FIG. 1 is a block diagram illustrating an example computing device that may provide a text-entry application in accordance with one or more aspects of the present disclosure.

FIG. 1 is a block diagram illustrating an example computing device 100 that may provide a text-entry application 102 in accordance with one or more aspects of the present disclosure. Computing device 100 may comprise one or more stand-alone devices or may be part of a larger system. In some examples, computing device 100 may comprise a mobile device. For example, computing device 100 may comprise or be part of a wireless communication device (e.g., wireless mobile handset or device), a video telephone, a digital multimedia player, a personal digital assistant (PDA), a video game console, a laptop computer, a tablet computer, or other devices. In some examples, computing device 100 may communicate with external, distinct devices via one or more networks (not shown), such as one or more wired or wireless networks, which may, in some cases, provide access to the Internet.

As shown in the example of FIG. 1, computing device 100 may include one or more applications 104A-104N and text-entry application 102. Applications 104A-104N and text-entry application 102 may be executed by computing device 100 (e.g., by one or more processors included within computing device 100, as described in more detail with respect to FIG. 2). In some examples, text-entry application 102 may be displayed on at least a portion of a presence-sensitive user interface device (e.g., user interface) associated with computing device 100. The presence-sensitive user interface device may be, for example, a touch screen of computing device 100, responsive to tactile input via a user's finger, for example. During execution, user interaction with text-entry application 102 may result in a graphical user interface associated with computing device 100. The graphical user interface may be displayed in at least another portion of the touch screen of computing device 100. In this manner, computing device 100 may comprise a screen, such as a touch screen, and the screen may include one portion that displays data associated with an application executing on computing device 100 and another portion that allows the user to provide input into the application.

Each of applications 104A-104N is operable on computing device 100 to perform one or more functions during execution. For example, one or more of applications 104A-104N may comprise a web or a communication application that interacts and/or exchanges data with a device that is external to computing device 100. A web application may, in some examples, be executable within a web browser that is operable on computing device 100. A communication application may, in some examples, be a messaging application, such as, short message service (SMS) application. Computing device 100 may, in various examples, download or otherwise obtain one or more of applications 104A-104N from an external server via one or more networks (not shown). For example, a web browser hosted by computing device 100 may download one or more of applications 104A-104N upon access of one or more web sites hosted by such as external server (e.g., web server). In some examples, at least a portion of applications 104A-104N may be text-based.

During execution, any of applications 104A-104N may implement, invoke, execute, or otherwise utilize text-entry application 102 as a mechanism to obtain user input. For example, if application 104A is an e-mail application, it may invoke execution of text-entry application 102 to allow a user to enter or type in e-mail text. In another example, if application 104N is a web browser application, it may invoke execution of text-entry application 102 to allow a user to enter Uniform Resource Identifier (URI) information or to provide user input during execution of one or more web applications.

Text-entry application 102 may, during execution, display or control a gesture interface 106, which includes one or more areas with which a user interacts via gestures to input text. In one example, gesture interface 106 may be a presence-sensitive user interface device associated with computing device 100. In examples where computing device 100 includes a touch screen user interface, a user may interact with the touch screen via gestures to provide text entry, where gesture interface 106 may be a portion of the touch screen.

Computing device 100 may display, via the user interface, a sequence of characters corresponding to the one or more characters input by the user via gestures on gesture interface 106. Computing device 100 may employ a processor to execute a gesture-interpretation algorithm that, based on the user gestures, displays characters and applies operations corresponding to the gestures. The characters may correspond to letters and/or punctuation, which the user may draw using gestures on gesture interface 106. Using the techniques of this disclosure, the user may input gestures on gesture interface 106 corresponding to operations such as, for example, editing operations. Some example editing operations may be adding a space, inserting a return, and deleting the last character, word, paragraph, or all the text the user has input. In this manner, the user may interact with the same interface to enter text and to apply text editing operations. The gesture-interpretation algorithm may be capable of differentiating between gestures representing characters and gestures representing editing operations, as will be described in more detail below.

As indicated above, in one example, a display device associated with computing device 100 may include a presence-sensitive user interface device portion (e.g., touch screen), which may be responsive to tactile input by a user. A portion of the touch screen may be dedicated to text entry and editing such as, for example, gesture interface 106. According to techniques of this disclosure, gesture interface 106 may be partitioned into two or more areas, as will be described in more detail below. The user may use gestures to input characters (e.g., letters, punctuation, and the like) as if handwriting in one of the areas within gesture interface 106. In some instances, the user may wish to apply a text editing operation or input a character that cannot be drawn, e.g., space, return, delete, and the like. In one example, the user may utilize gestures that cross from one of the areas to another of the areas within gesture interface 106 to define a desired operation. The operation may depend on the direction of the gesture and the areas traversed by the gesture. A gesture-interpretation algorithm may interpret the gestures and display the corresponding characters and/or apply the corresponding operation to characters already entered by the user such as, for example, adding a space after the last character, adding a return, deleting the last character, word, paragraph, or all entered text.

The techniques of this disclosure may, in some instances, allow a user to use gestures to input text and apply text-editing operations using the same interface, e.g., gesture interface 206. In these instances, the user would not need to switch to a different screen when the user needs to add a special operation to the text. In one example, techniques of this disclosure may provide the user with defined areas within the interface such that gestures associated with one defined area may be associated with text-entry, and gestures associated with another defined area may be associated with text-editing operations.

Figure 2:
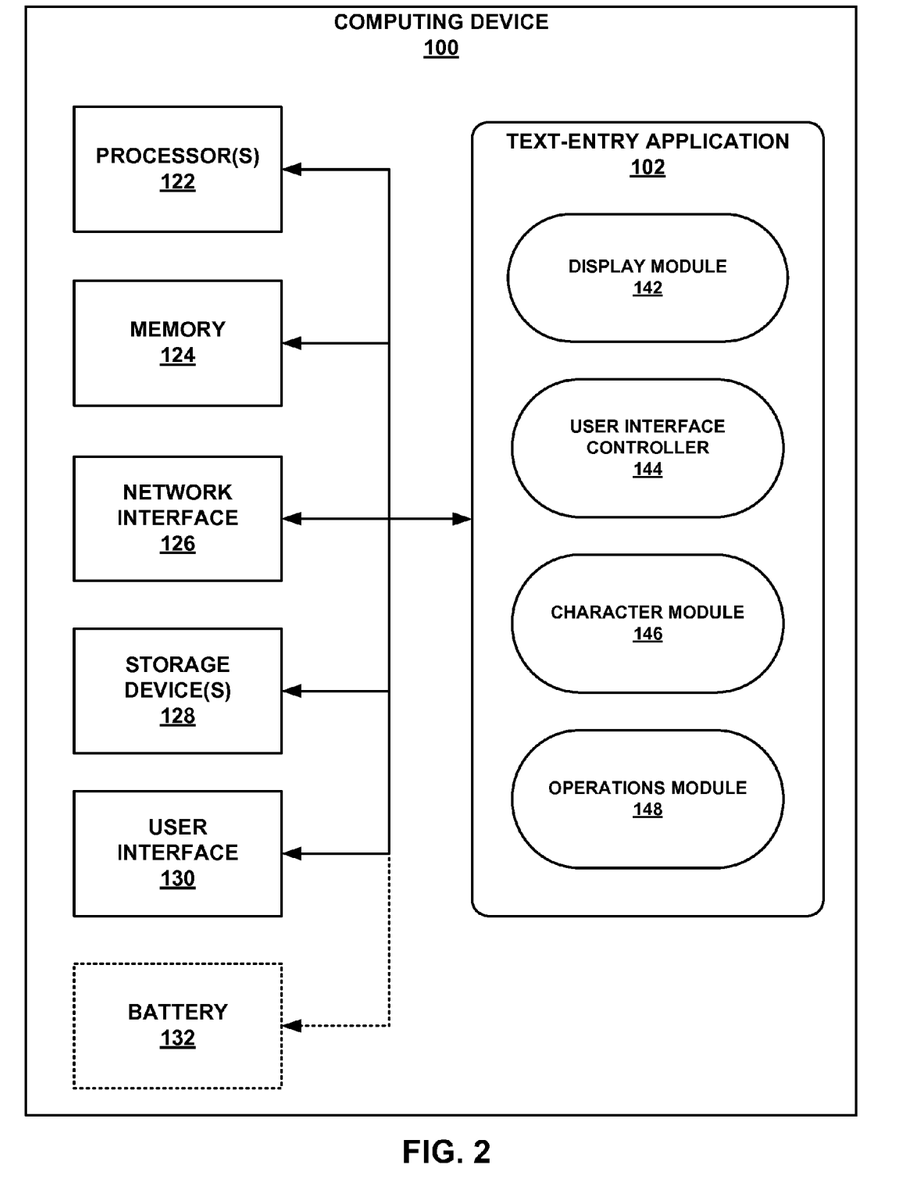
FIG. 2 is a block diagram illustrating further details of the computing device shown in FIG. 1.

FIG. 2 is a block diagram illustrating further details of the computing device 100 shown in FIG. 1. FIG. 2 illustrates only one particular example of computing device 100, and many other example embodiments of computing device 100 may be used in other instances. As shown in the example of FIG. 2, computing device 100 includes one or more processors 122, memory 124, a network interface 126, one or more storage devices 128, user interface 130, and an optional battery 132. For example, if computing device 100 comprises a mobile device, computing device 100 may include battery 132. Each of components 122, 124, 126, 128, 130, and 132 may be interconnected via one or more busses for inter-component communications. Processors 122 may be configured to implement functionality and/or process instructions for execution within computing device 100. Processors 122 may be capable of processing instructions stored in memory 124 or instructions stored on storage devices 128.

User interface 130 may include, for example, a monitor or other display device for presentation of visual information to a user of computing device 100. User interface 130 may further include one or more input devices to enable a user to input data, such as a manual keyboard, mouse, touchpad, track pad, etc. In some example, user interface 130 may comprise a presence-sensitive user interface device such as, for example, a touch screen, which may be used both to receive and process user input and also to display output information. User interface 130 may further include printers or other devices to output information. In various instances in the description contained herein, references made to user interface 130 may refer to portions of user interface 130 (e.g., touch screen) that provide user input functionality. In one example, user interface 130 may be a touch screen that is responsive to tactile input by the user.

Memory 124 may be configured to store information within computing device 100 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on computing device 100 (e.g., one or more of applications 104A-104N shown in FIG. 1 or the gesture-interpretation algorithm) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 100 also includes network interface 126. Computing device 100 may utilize network interface 126 to communicate with external devices (e.g., one or more servers, web servers) via one or more networks, such as one or more wireless/wired networks. Computing device 100 may utilize network interface 126 in response to execution of one or more applications that require transferring data to and/or from other devices (e.g., other computing devices, servers, or the like).

Any applications implemented within or executed by computing device 100 (e.g., applications 104A-104N shown in FIG. 1 or the gesture-interpretation algorithm) may be implemented or contained within, operable by, executed by, and/or be operatively coupled to processors 122, memory 124, network interface 126, storage devices 128, and/or user interface 130.

One example of text-entry application 102 is shown in FIG. 2. Text-entry application 102 may include a display module 142, a user interface controller 144, a character module 146, and an operations module 148. Text-entry application 102 may provide or display gesture interface 106 shown in FIG. 1 (e.g., via user interface 130). Text-entry application 102 may be stored in memory 124 and/or storage devices 128, and may be operable by processors 122 to perform various tasks during execution.

In one example, during implementation or execution of text-entry application 102, display module 142 may be operable by processors 122 to define a portion for text and operation entry (e.g., gesture interface 106) via user interface 130. User interface controller 144 may be operable by processors 122 to receive, via user interface 130, user input specifying characters and/or operations in the form of gestures drawn on gesture interface 106. The user input may comprise a contact with user interface 130 (e.g., contact with a touch screen), and wherein each of the gestures is associated with a character or an operation.

Character module 146 and operations module 148 may be operable by processor 122 to determine, based on gestures the user draws on user interface 130, the appropriate characters to display and operations to apply to the displayed characters. In one example, display module 142 may define gesture interface 106 on user interface 130. Gesture interface 106 may be generally rectangular in some examples. In one example, horizontal and/or vertical lines may be used to define different areas within gesture interface 106. In one example, the lines may be close to the edge of gesture interface 106, thus defining a larger area in the middle where a user may use gestures to draw characters for text entry. The characters may be letters, numbers, punctuation, and the like. The lines may define smaller areas closer to the outer edges of gesture interface 106. Using certain gestures that traverse the larger area and the smaller, the user may be able to apply operations to the already-entered characters. The operations may be a space, a line return, or deletion of previously-entered characters, for example. In one example, character module 146 may determine a character based on gestures in the larger area of gesture interface 106, and operations module 148 may determine an operation based on gestures that cross the lines defining the smaller areas in gesture interface 106.

Processor 122 may be operable to execute one or more algorithms including, for example, a gesture-interpretation algorithm. In one example, the gesture-interpretation algorithm may determine whether gestures drawn by a user correspond to characters or editing operations. Based on the determination, the gesture-interpretation algorithm may process the drawn gestures to the appropriate module for further interpretation. For example, if the gesture-interpretation algorithm determines that a drawn gesture is a character, the algorithm sends the gesture data associated with the drawn gesture to character module 146 for further interpretation. If, for example, the gesture-interpretation algorithm determines that a drawn gesture is an editing operation, the algorithm sends the gesture data associated with the drawn gesture to operations module 148 for further interpretation. The gesture-interpretation algorithm will be discussed in more detail below.

As the user utilizes gestures to draw characters and operations, the gesture-interpretation algorithm determines whether the gestures are characters or operations, and character module 146 and operations module 148 may determine the matching desired characters and operations, respectively. Display module 142 may be operable to receive the determined characters and operations for display to the user on user interface 130. The entered text and operations may be displayed in a manner that depends on the application that computing device 100 may be running, where at least a portion of the application is text based, and the user utilizes gesture interface 106 to enter text into the application (e.g., e-mail, web browser, SMS application, and the like). Display module 142 may be operable to display the gestures are they user draws them on gesture interface 106, and the corresponding characters in the application.

FIGS. 3A-3G are block diagrams illustrating example screens of a computing device 300 as a user interacts with the device, in accordance with one or more aspects of the present disclosure. As shown in the example, a series of screens may be shown on a computing device 300, such as a mobile device (e.g., a smart phone). Computing device 300 may operate in the same manner as computing device 100 of FIGS. 1 and 2. Computing device 300 may include one or more user interface devices that allow a user to interact with the device. Example user interface devices may include, for example, a mouse, a touchpad, a track pad, a keyboard, a touch screen, or the like. Computing device 300 may also include screen 302 via which computing device 300 displays to the user application-related options and screens. In one example, screen 302 may be a touch screen that allows interaction by user's touch via user's finger or a device (e.g., stylus pen).

Figure 3A:
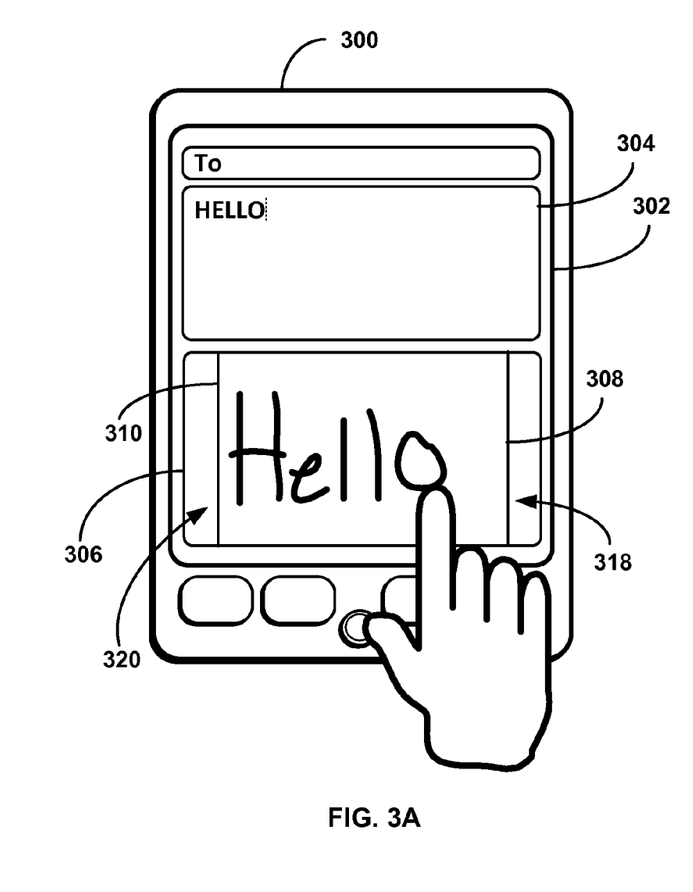
FIGS. 3A-3G are block diagrams illustrating example screens of a computing device as a user interacts with the device, in accordance with one or more aspects of the present disclosure.

FIGS. 3A-3G illustrate an example progression, according to the techniques described herein, as the user provides input to computing device 300 via a user interface device such as, for example, gesture interface 306. In one example, gesture interface 306 may be an area defined within screen 302. As FIG. 3A illustrates, gesture interface 306 may be displayed on touch screen 302 of computing device 300, where a user may use his/her fingers or a device (e.g., stylus pen) to interact with the touch screen and user gestures to enter and edit text associated with a text-based application running on computing device 300. Screen 302 may display in a display portion 304, which may comprise a graphical user interface, the text that the user inputs into the text-based application.

Screen 302 shows an example text-based application (e.g., e-mail, SMS, or the like) that is running on computing device 300. The text-based application allows the user to enter text into various fields, such as a "To" field and a body field. If the user wishes to enter text, the user may draw the characters (e.g., letters, numbers, punctuation, and the like) using gestures in gesture interface 306. For example, the user may use contact (e.g., by touching or using a stylus) to draw within gesture interface 306 the words he/she desired to enter into the application. As illustrated in FIG. 3A, gesture interface 306 may have a large defined area in the middle, bounded by lines 308 and 310, where the user may use gestures to enter characters. Lines 308 and 310 may partition the area defined by gesture interface 306 by defining the boundaries for areas 318 and 320. In this example, the user may have entered the word "HELLO" by drawing it as shown in FIG. 3A.

Figure 3B:
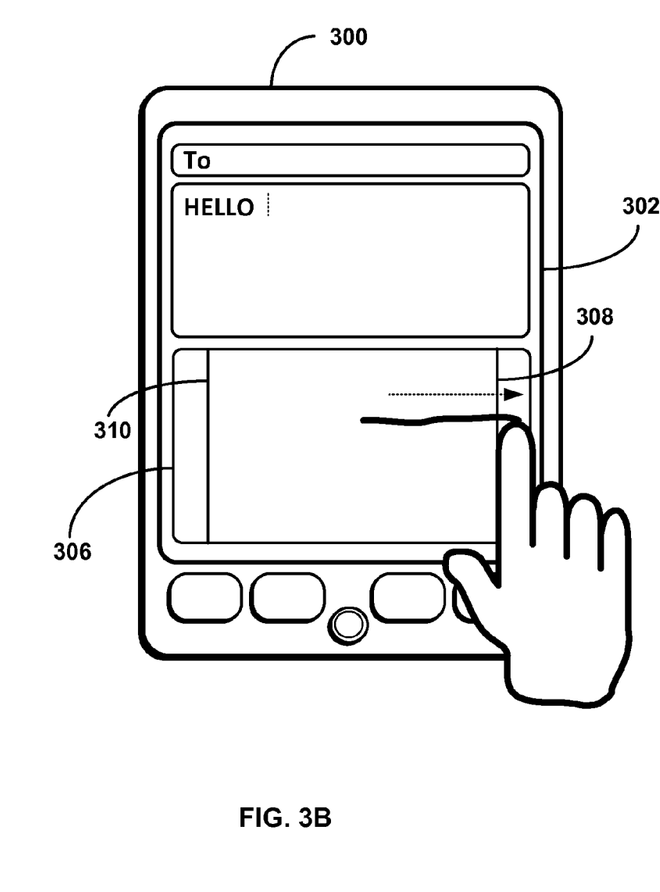

Computing device 300 may display, via the user interface, a sequence of characters corresponding to the characters drawn by the user, as shown in text display portion 304. Computing device 300 may employ a processor to execute an algorithm (e.g., a gesture-interpretation algorithm) that generates, based on the drawn gestures, characters that match the gestures drawn by the user. As the user draws more characters using gestures, the gesture-interpretation algorithm may determine that the drawn gesture is associated with characters and send the gesture data associated with the drawn gestures to character module 146. Character module 146 (FIG. 2) may then determine the appropriate characters to display. In one example, the user may wish to enter a non-character operation (e.g., space, line return, delete, and the like), which may not be represented by a drawn character as would letters, numbers, or punctuation. As FIG. 3B illustrates, the user may utilize gestures in accordance with techniques of this disclosure to input operations that are not characters. As shown in FIG. 3B, lines 308 and 310 may define smaller areas 318 and 320, respectively, near the edges of gesture interface 306. The user may utilize gestures involving lines 308 and 310 to define non-character operations. In the example of FIG. 3B, the user may touch gesture interface 306 somewhere between lines 308 and 310, and swipe to the right to cross line 308. The gesture-interpretation algorithm may determine that the drawn gesture is associated with an editing operation and send the drawn gesture to operation module 148. Operations module 148 may then interpret the drawn gesture to determine the associated editing operation, e.g., a SPACE, resulting in adding a space after the last entered word "HELLO."

Figure 3C:
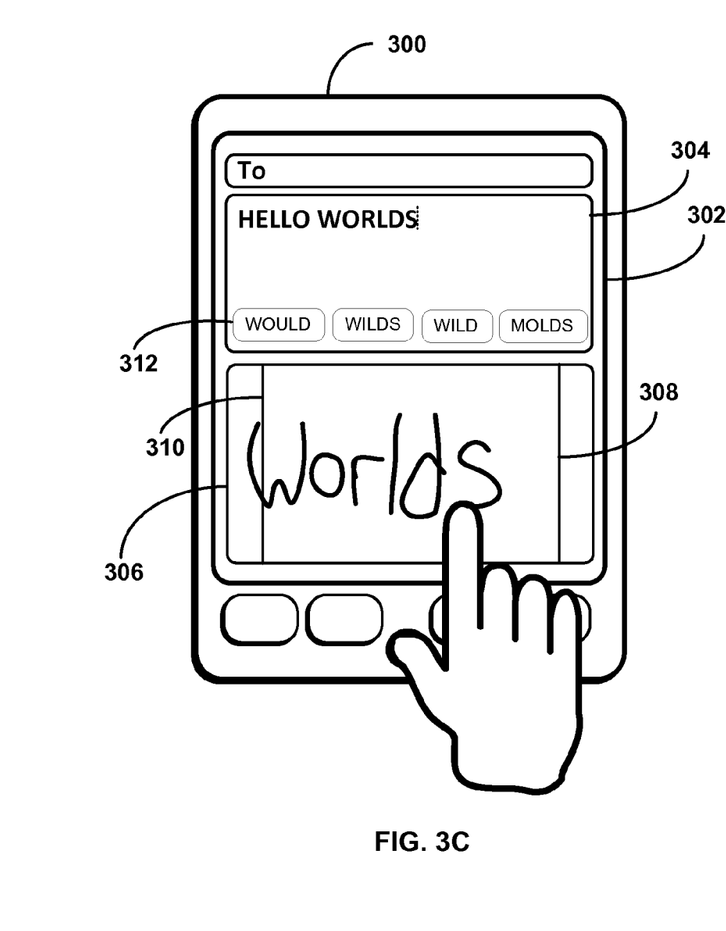
Figure 3D:
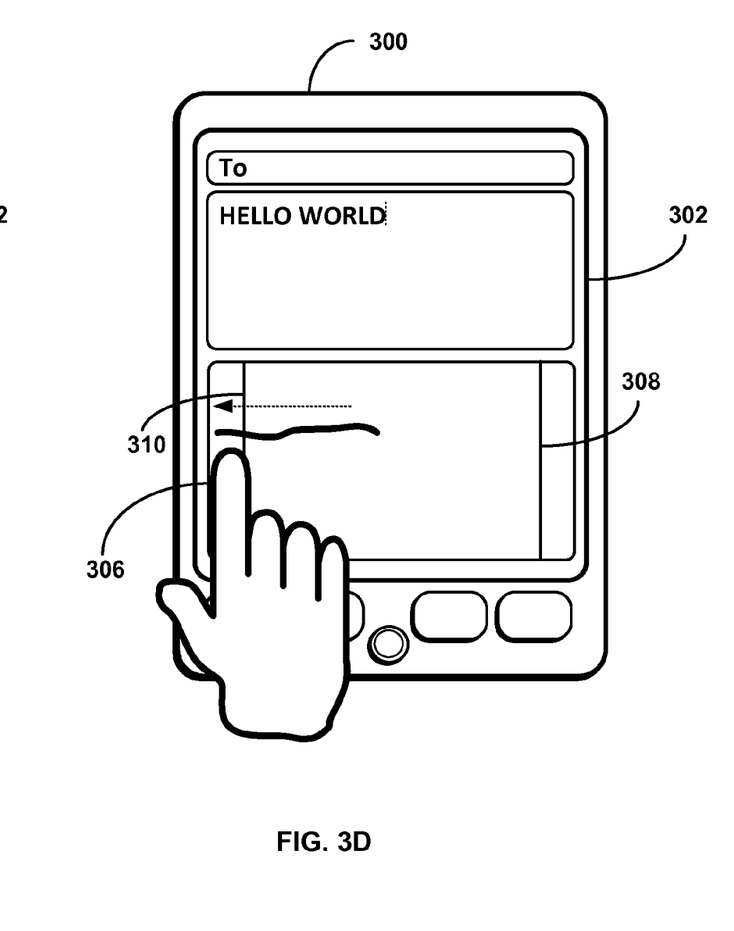

Using gestures, the user may then input another word as shown in FIG. 3C. For example, the word "WORLDS." The user may have intended to enter the word "WORLD," and may wish to correct the last entry by deleting the letter S. The user may utilize gestures involving lines 308 and 310 to indicate the desire to delete the last-entered letter. As shown in the example of FIG. 3D, the user may touch gesture interface 306 somewhere between lines 308 and 310, and swipe to the left to cross line 310. Operation module 148 may interpret the gesture to determine the associated editing operation, e.g., DELETE, resulting in deleting the last entered character, as FIG. 3D illustrates.

In one example, when the user wishes to write text using gestures, the user may write anywhere within gesture interface 306. As FIG. 3C shows, the user may start writing anywhere, even in the areas 318 and 320 defined by lines 308 and 310. When the user draws gestures, character module 146 may determine the best match for each character and display it. In other examples, character module 146 may display the best match, and may provide the user with other candidate words 312 as shown in FIG. 3C. The user may disregard the candidate words by continuing to draw gestures, indicating that the best match is the desired word or character or may select one of the suggestions by touching the screen where the correct suggestion word is displayed.

Figure 3E:
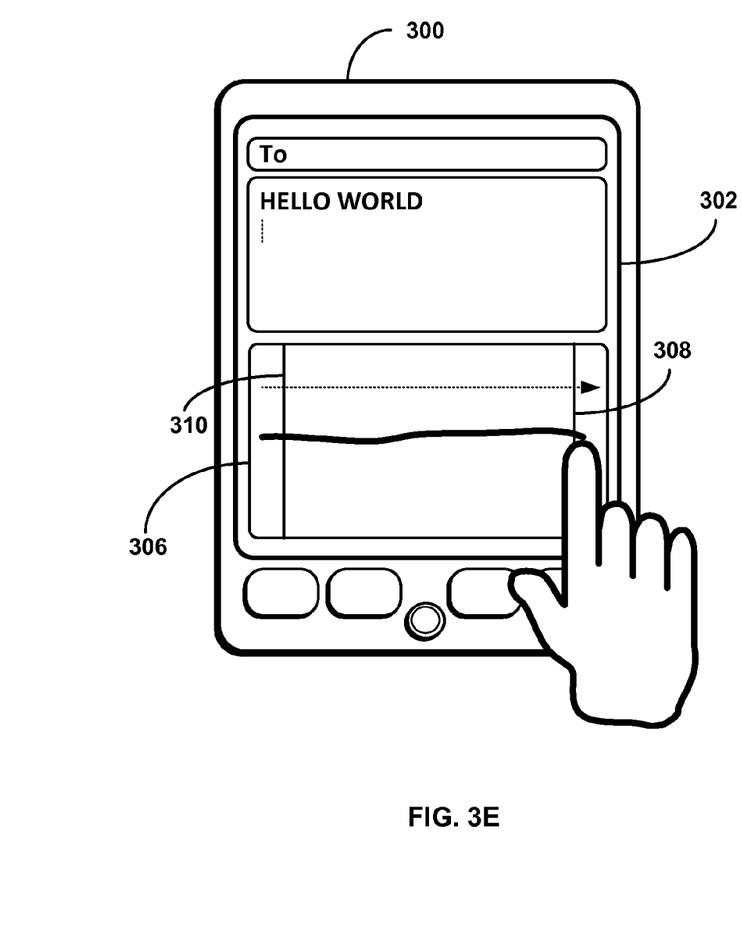
Figure 3F:
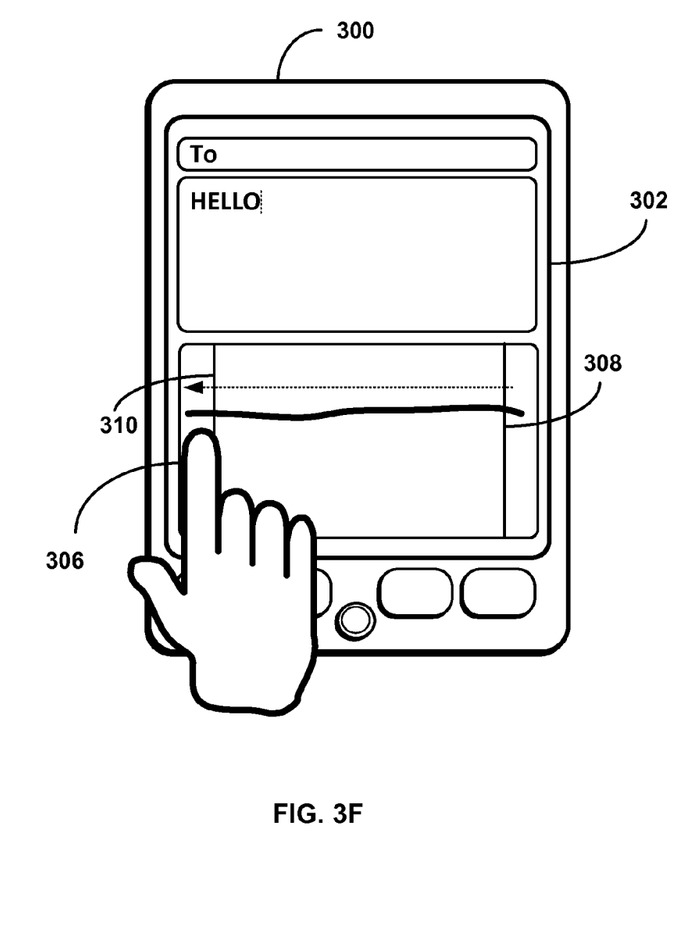
Figure 3G:
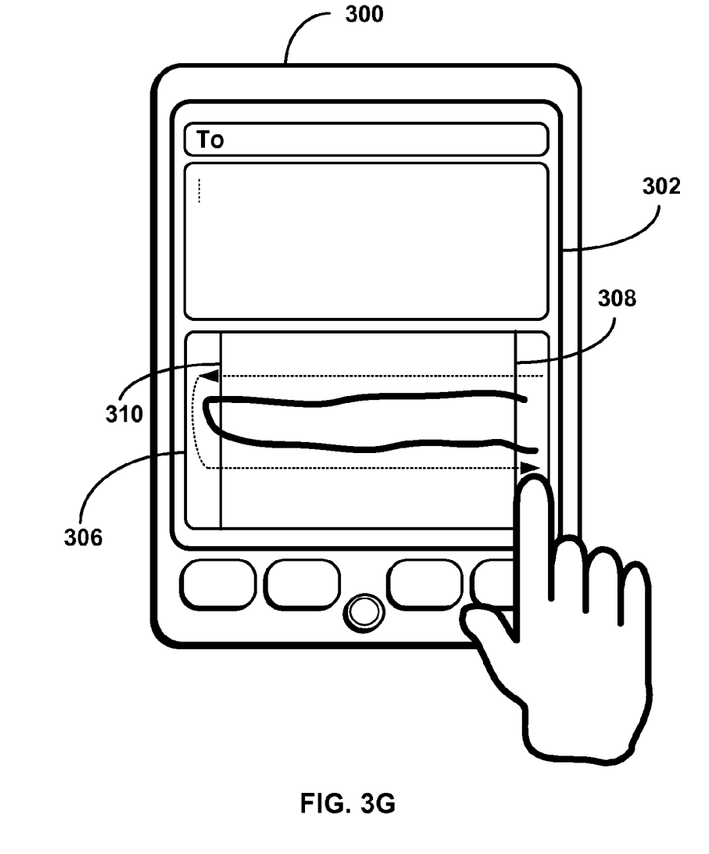

As noted above, one example for adding SPACE may be achieved by starting between lines 308 and 310, and swiping right to cross line 308, as FIG. 3B illustrates. Another example, to DELETE the last character, the user may start between lines 308 and 310, and swipe left to cross line 310, as FIG. 3D illustrates. To indicate a RETURN/ENTER (or GO for applications such as search in a browser), the user may start left of line 310 and swipe all the way across gesture interface 306 to cross lines 310 and 308 as illustrated in FIG. 3E. In yet another example, to issue a DELETE of the last word, the user may start by touching right of line 308 and swipe all the way across gesture interface 306 to cross lines 308 and 310, as illustrated in FIG. 3F. Yet another example may be if the user wishes to issue a DELETE of all the text entered thus far by starting right of line 308 and swiping in a C-shape, thus swiping across gesture interface to the left to cross lines 308 and 310 then returning across and crossing lines 310 and 308, as illustrated in FIG. 3G. It should be understood that there examples of gestures and operations are merely illustrative using the most popular operations, and that other patterns and operations may be implemented using the techniques of this disclosure. In some examples, horizontal and vertical lines may be utilized.

Figure 4A:
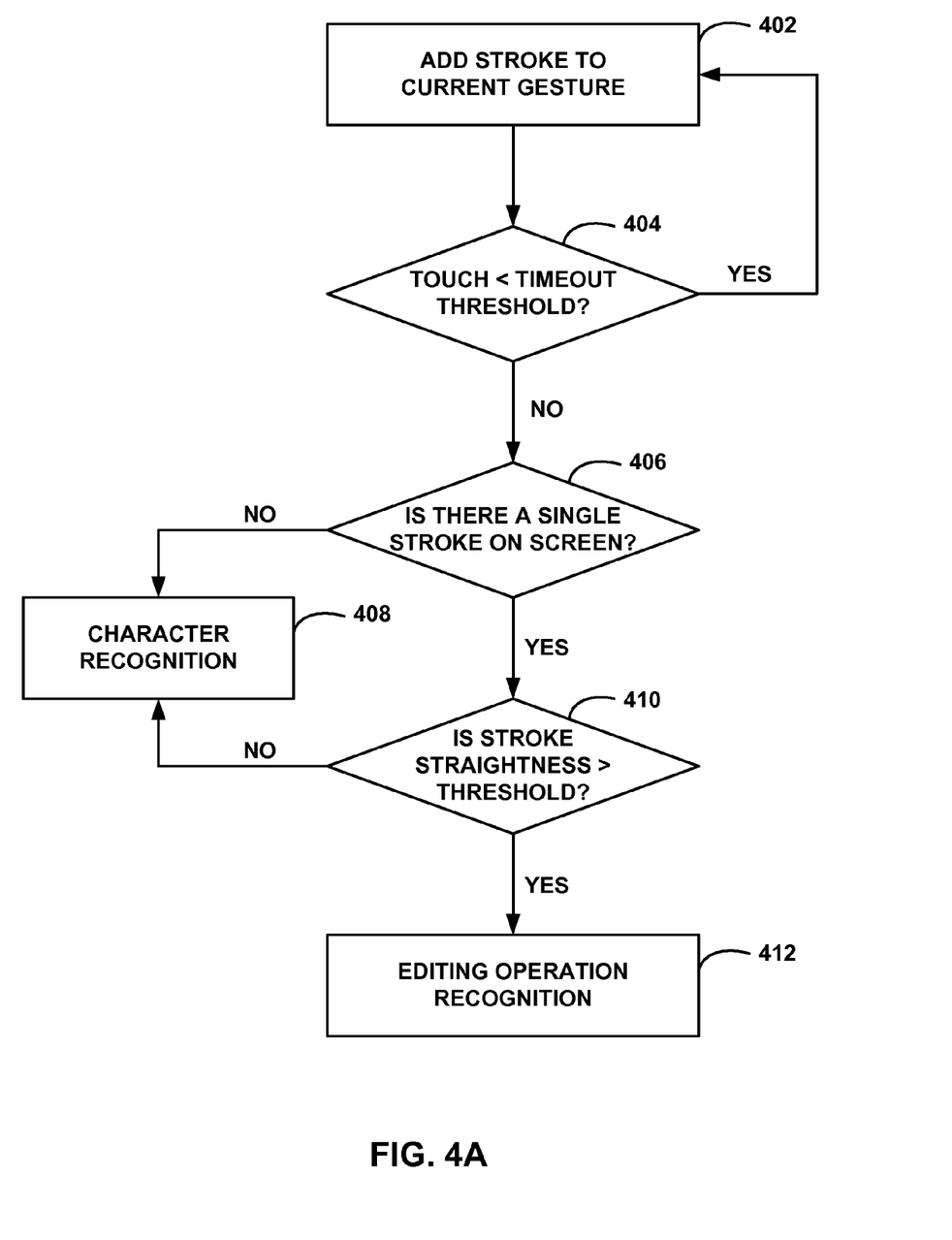
FIG. 4A is a flow diagram illustrating an algorithm for interpreting gestures in accordance with one or more aspects of the present disclosure.

FIG. 4A is a flow diagram illustrating an algorithm for interpreting gestures in accordance with one or more aspects of the present disclosure. As noted above, a processor (e.g., processor 122) may execute a gesture-interpretation algorithm to determine whether a drawn gesture corresponds to a character or an editing operation, and send gesture data associated with the drawn gesture to the appropriate module for recognition and display. When the user starts drawing gestures on the touch screen of the computing device, as discussed above, the sensed drawn stroke may be added by the algorithm to a current gesture (402). A stroke may correspond to a shape drawn by the user in one touch without lifting a finger or stylus off the touch screen. Referring back to FIG. 3A, for example, the leftmost vertical line of the letter H is one stroke, the horizontal part of the letter H is another stroke, and the rightmost vertical line of the letter H is another stroke. As FIGS. 3B, 3D, and 3E-3F illustrate, gestures associated with editing operations may comprise one stroke.

The gesture-interpretation algorithm may then determine whether the next time the user makes contact with the touch screen is less than a timeout threshold (404). The timeout threshold may be a time that indicates, when exceeded, that the user has completed drawing one gesture and is drawing another gesture. In one example, the timeout threshold may be 500 ms. The timeout threshold may be set by default to a certain value, may be configurable by the user, or may be automatically configured by the computing device based on user's historical touching patterns. After every stroke, a timer may be reset, and when the user makes the next contact with the touch screen, the timer may be stopped to determine the time difference between the last stroke and the current one. The time difference may be compared to the timeout threshold to determine the whether the user's touch was less than the timeout threshold (404).

If the user makes contact with the touch screen within the timeout threshold, the stroke the user is indicating should be added to the current gesture (402). If the user makes contact with the touch screen beyond the timeout threshold, the stroke the user is indicating is not part of the current gesture and a new gesture should be started. The algorithm may then interpret the current gesture on the screen to determine the appropriate module to handle it. The algorithm may determine if the current gesture includes a single stroke (406). If the current gesture includes more than one stroke, the algorithm then determines that the current gesture corresponds to a character. The algorithm may then send the data associated with the current gesture to character module 146 for character recognition (408).

If the current gesture includes a single stroke that crosses at least one of the lines (e.g. lines 308 and 310) defining boundaries between the visually-defined areas of the touch screen, the algorithm determines the stroke's straightness and whether it exceeds a straightness threshold (410). The determination of straightness is described in more detail below. If the straightness of the stroke does not exceed the threshold, that indicates that the stroke is not straight enough, and that the current gesture corresponds to a character. The algorithm may then send the data associated with the current gesture to character module 146 for character recognition (408). If the straightness of the stroke exceeds the threshold, that indicates that the stroke is straight, and that the current gesture corresponds to an editing operation. The algorithm may then send the data associated with the current gesture to editing operations module 148 for operation recognition (412).

Figure 4B:
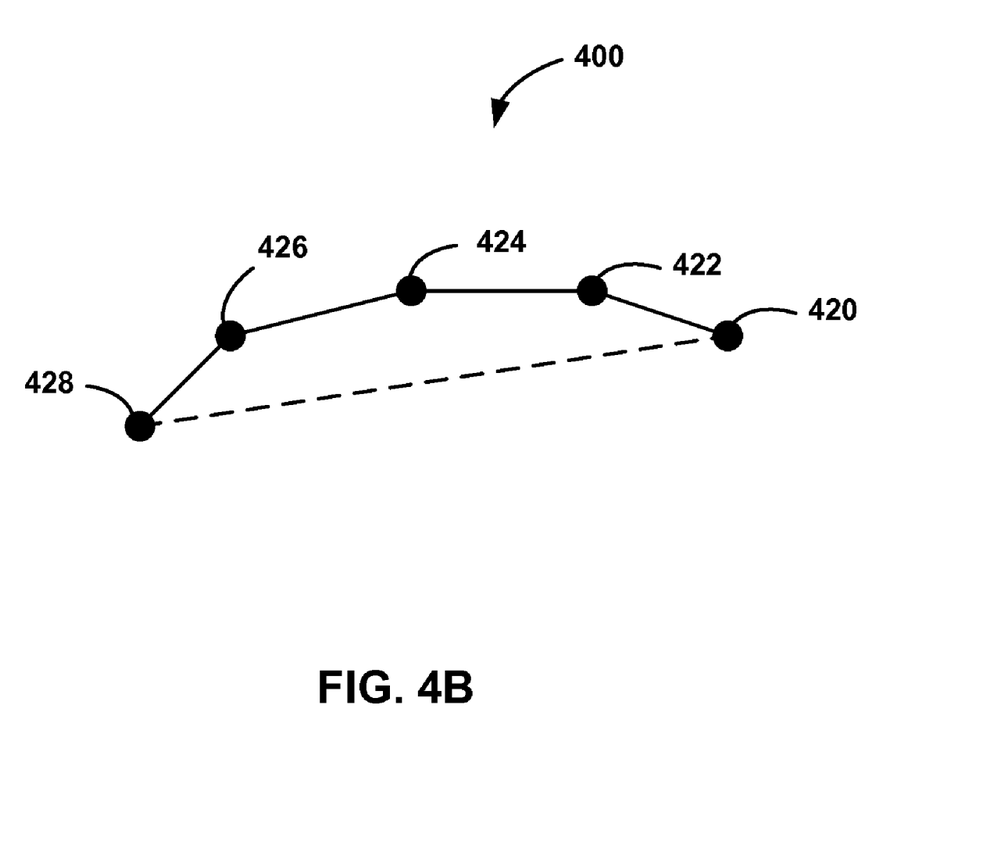
FIG. 4B is an example stroke drawn by a user on a touch screen of a computing device.

FIG. 4B is an example stroke 400 drawn by a user on a touch screen of a computing device. In determining the straightness of stroke 400, the algorithm may analyze segments of the stroke. The segments of the stroke may be defined by the points defining the stroke, where the points correspond to pixels on the touch screen. In this example, stroke 400 has 4 segments defined by points 420, 422, 424, 426, and 428. To determine the straightness of stroke 400, the algorithm determines the direct distance (direct_dist) from the starting point to the ending point of stroke 400, illustrated by the dotted line representing direct_dist (420, 428). The algorithm then determines the path distance of the stroke (path_dist), which is the sum of the lengths of all the segments of stroke 400. In this example:

$$\text{path\_dist}(420,428) = \text{direct\_dist}(420,422) + \text{direct\_dist}(422,424) + \text{direct\_dist}(424,426) + \text{direct\_dist}(426,428)$$

The algorithm then determines straightness of stroke 400 as follows:

$$\text{Straightness}(400) = \text{direct\_dist}(420,428)/\text{path\_dist}(420,428)$$

The straighter the stroke, the closer the straightness value will be to 1. The straightness threshold may therefore be close to 1, and the choice of the straightness threshold may depend on how sensitive the algorithm should be in determining whether a stroke is straight. In one example, the straightness threshold may be set to 0.8, thus allowing for a certain amount of curvature in the stroke, which may be due to shaking of user's hand while drawing the gesture.

In another example, the algorithm may also utilize a stroke path variation method to determine whether a single stroke is an editing operation. This may be utilized in some instances such as, for example, when some editing operations correspond to a gesture that is a single stroke but is not a straight stroke. One example may be the one illustrated by FIG. 3G, described above. In this example, the algorithm may determine to use the stroke path variation method based on the number of graphical lines crossed by the single stroke. The stroke path variation method may consider the number of corners in a stroke to determine whether a stroke should be interpreted as an editing operation or a character. For each point of a stroke, the algorithm may determine whether the point corresponds to a corner by determining the angle between adjacent line segments, and if the angle is above a certain threshold (e.g., 30 degrees), the point may be considered a corner. In the example of FIG. 4B, point 426 is the only corner in stroke 400. In the example of the stroke of FIG. 3G, the straightness method may not be effective in determining whether the stroke corresponds to an editing operation, because the direct distance between the two ends is a lot smaller than the sum of the segment lengths of the stroke, and therefore, the path variation method may be used instead. In the example of FIG. 3G, the algorithm may determine there are at least 2 corner points in the stroke, and therefore, the stroke corresponds to an editing operation.

Figure 5:
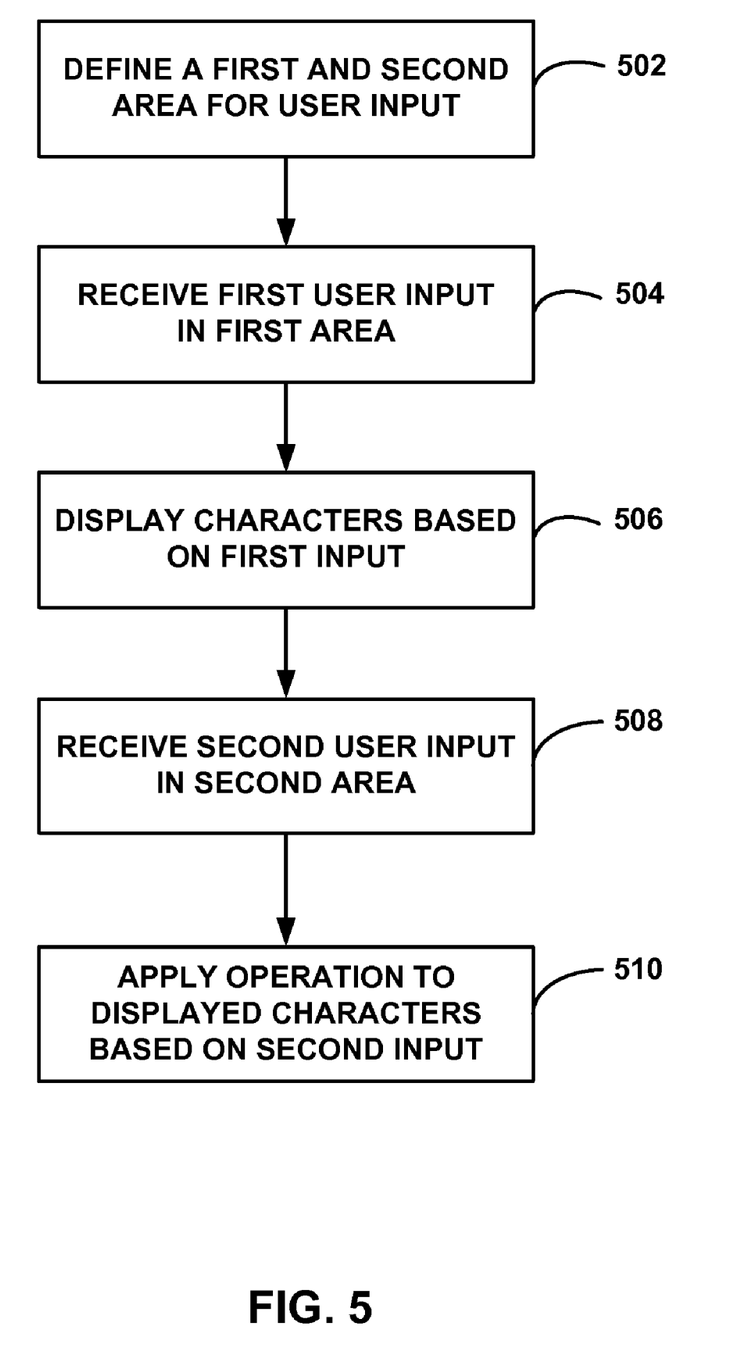
FIG. 5 is a flow diagram illustrating a method that may be performed by a computing device in accordance with one or more aspects of the present disclosure.

FIG. 5 is a flow diagram illustrating a method that may be performed by a computing device in accordance with one or more aspects of the present disclosure. For example, the illustrated example method may be performed by computing device 100 (FIGS. 1 and 2) or computing device 300 (FIGS. 3A-3D). In some examples, a computer-readable storage medium (e.g., a medium included in storage device 128 of FIG. 2) may be encoded with instructions that, when executed, cause one or more processors (e.g., processor 122) to perform one or more of the acts illustrated in the method of FIGS. 1, 2, and 3A-3D.

The method of FIG. 4 includes defining, for a presence-sensitive user interface device (e.g., touch screen 302) coupled to the computing device, a first area (e.g., gesture interface 306 or a lower region of the touch screen) and a second area (e.g., area right of line 308 and left of line 310) for user input (402). As illustrated above, the second area is a subset of the first area and is defined by one or more boundaries (e.g., horizontal and/or vertical lines) that partition the first area. The method also includes receiving, using the presence-sensitive user interface device, first user input comprising a drawing gesture associated with the first area, where the first user input specifies one or more characters (e.g., letters, numbers, punctuation, or the like) to be displayed in a graphical user interface (e.g., display portion 304 or upper region of the touch screen) associated with the computing device and a text-based application running on the computing device (404). Based on the user input, the determined characters may be displayed on the graphical user interface (406).

The presence-sensitive user interface device may also receive second user input comprising a gesture associated with the at least one of the one or more boundaries associated with the second area, wherein the second user input specifies an editing operation (e.g., SPACE, RETURN, DELETE, or the like) associated with the one or more characters (408). The second input may involve, for example, gestures that do not resemble characters, and which may cross the lines that define the second area. The method further includes applying, by the computing device, the specified operation to the one or more characters in response to receiving the second user input (410). In this manner, the user may utilize gestures to define one or more characters to display, and may also utilize gestures, without changing from gesture-based input, to apply other non-character operations.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a computer-readable storage medium, containing instructions. Instructions embedded or encoded in a computer-readable medium, including a computer-readable storage medium, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, a computer-readable storage medium may comprise a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the disclosure have been described. These and other embodiments are within the scope of the following claims.

The invention claimed is:

1. A method comprising:
    receiving, using a presence-sensitive display coupled to a computing device, a first user input comprising a first drawing gesture associated with a first area for user input defined at the presence-sensitive display, wherein the first user input specifies one or more characters to be displayed at the presence-sensitive display, and wherein the first drawing gesture includes a drawn representation of the one or more characters;
    receiving, using the presence-sensitive display, a second user input comprising a second drawing gesture, wherein the second drawing gesture spans only the first area and a second area for user input defined at the presence-sensitive display, and wherein the second user input specifies a first editing operation associated with the one or more characters;
    applying, by the computing device, the first editing operation to the one or more characters in response to receiving the second user input;
    receiving, using the presence-sensitive display, a third user input comprising a third drawing gesture, wherein the third drawing gesture spans the first area, the second area, and a third area for user input defined at the presence-sensitive display, and wherein the third user input specifies a second editing operation associated with the one or more characters; and
    applying, by the computing device, the second editing operation to the one or more characters in response to receiving the third user input.

2. The method of claim 1, wherein the first editing operation is based on a direction of the second drawing gesture that spans the first area and the second area.

3. The method of claim 1,
    wherein the second area comprises a subset of the first area, and wherein the second area is defined by a first graphical boundary that partitions the first area.

4. The method of claim 3, wherein the second drawing gesture crosses the first graphical boundary.

5. The method of claim 3, wherein the first editing operation is based on a number of times the first graphical boundary is crossed based on the received second user input.

6. The method of claim 3,
    wherein the third area comprises a subset of the first area, wherein the third area is defined by a second graphical boundary that partitions the first area, and wherein the third user input comprises crossing the first graphical boundary and the second graphical boundary.

7. The method of claim 6, wherein the second editing operation is based on a direction of crossing of the first graphical boundary and the second graphical boundary based on the received third user input.

8. The method of claim 6, wherein the second editing operation is based on a number of times the first graphical boundary and the second graphical boundary is crossed based on the received third user input.

9. The method of claim 6, wherein the second editing operation is based on which of the first graphical boundary and the second graphical boundary is crossed based on the received third user input.

10. The method of claim 1, further comprising determining whether the second user input specifies the one or more characters or specifies the second editing operation.

11. The method of claim 10, wherein the second user input specifies the first editing operation when the second drawing gesture comprises a single stroke that spans the first area and the second area, and when a straightness associated with the second drawing gesture is above a straightness threshold.

12. The method of claim 1, wherein the first editing operation comprises at least one of adding a space, adding a return, or performing a deletion of at least one of the one or more characters.

13. The method of claim 1, wherein the presence-sensitive display comprises a touch screen, wherein the touch screen displays the first area and the second area, and wherein the touch screen comprises an upper region and a lower region, the method further comprising:
    displaying the first area and the second area in the lower region; and
    displaying the one or more characters in the upper region.

14. The method of claim 1, further comprising displaying in the first area a representation of the one or more characters corresponding to the first user input.

15. The method of claim 1, further comprising displaying in the first area a representation of the second editing operation corresponding to the second user input.

16. The method of claim 1, wherein the first user input, the second user input, and the third user input are received at the presence-sensitive display without receiving any input from an on-screen keypad.

17. The method of claim 3, wherein the first graphical boundary comprises at least one horizontal or vertical graphical line partitioning the first area near at least one outer edge associated with the first area.

18. A computer-readable storage medium encoded with instructions that, when executed, cause one or more processors of a computing device to perform operations comprising:
- receiving, using a presence-sensitive display coupled to the computing device, a first user input comprising a first drawing gesture associated with a first area for user input defined on the presence-sensitive display, wherein the first user input specifies one or more characters to be displayed at the presence-sensitive display, and wherein the first drawing gesture includes a drawn representation of the one or more characters;
- receiving, using the presence-sensitive display, second user input comprising a second drawing gesture, wherein the second drawing gesture spans only the first area and a second area for user input defined at the presence-sensitive display, and wherein the second user input specifies a first editing operation associated with the one or more characters;
- applying, by the computing device, the first editing operation to the one or more characters in response to receiving the second user input;
- receiving, using the presence-sensitive display, third user input comprising a third drawing gesture, wherein the third drawing gesture spans the first area, the second area, and a third area for user input defined at the presence-sensitive display, and wherein the third user input specifies a second editing operation associated with the one or more characters; and
- applying, by the computing device, the second editing operation to the one or more characters in response to receiving the third user input.

19. A computing device, comprising:
- one or more processors;
- a presence-sensitive display;
- wherein the presence-sensitive display is configured to receive first user input comprising a first drawing gesture associated with a first area for user input defined at the presence-sensitive display, wherein the first user input specifies one or more characters to be displayed at the presence-sensitive display, wherein the first drawing gesture includes a drawn representation of the one or more characters,
- wherein the presence-sensitive display is further configured to receive second user input comprising a second drawing gesture, wherein the second drawing gesture spans only the first area and a second area for user input defined at the presence-sensitive display, wherein the second user input specifies a first editing operation associated with the one or more characters, and
- wherein the presence-sensitive display is further configured to receive third user input comprising a third drawing gesture, wherein the third drawing gesture spans the first area, the second area, and a third area for user input defined at the presence-sensitive display, and wherein the third user input specifies a second editing operation associated with the one or more characters; and
- an operations module operable by the one or more processors, wherein the operations module is configured to apply the first editing operation to the one or more characters in response to receiving the second user input, and wherein the operations module is further configured to apply the second editing operation to the one or more characters in response to receiving the third user input.

* * * * *